W. TUNSTILL.
NUT-LOCK.
No. 185,877.      Patented Jan. 2, 1877.
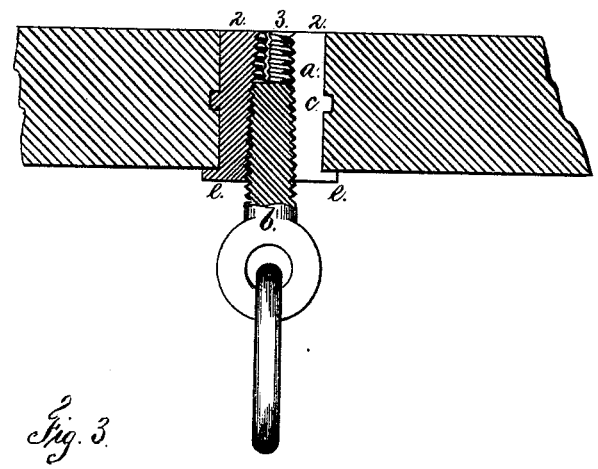
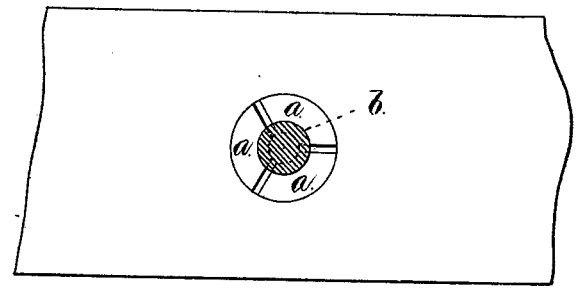
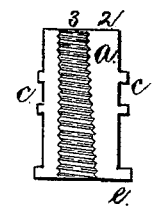 
Witnesses,
Chas. H. Smith
Geo. T. Pinckney.
Inventor
William Tunstill.
per Lemuel W. Serrell atty.

UNITED STATES PATENT OFFICE.

WILLIAM TUNSTILL, OF BROOKLYN, E. D., NEW YORK.

IMPROVEMENT IN NUT-LOCKS.

Specification forming part of Letters Patent No. 185,877, dated January 2, 1877; application filed June 7, 1876.

*To all whom it may concern:*

Be it known that I, WILLIAM TUNSTILL, of Brooklyn, E. D., in the county of Kings and State of New York, have invented an Improvement in Nut-Locks for Bolts, of which the following is a specification:

Nuts have been made in two or more sections held together, and expansive nut-locks and clevises have been made for a screw to pass into in a wall or stone, to hold such screw by the expansion of a portion of the nut within the cavity that receives it.

My invention is made for connecting a screw to a piece of stone, wood, or other material; and consists in a divided nut, each piece of which is a segment of a cylinder, and made thicker at the inner end than the outer, so that the central hole, formed by placing the segments together, is smallest at the inner end, and the surfaces of the metal sections at such hole are corrugated with the screw-threads, so that when an ordinary screw is screwed into the nut the sections will be expanded, and bind at the inner end firmly within the hole that receives them.

In the drawing, Figure 1 is a longitudinal section of the nut and screw. Fig. 2 shows one of the sections of the nut separately, and Fig. 3 is an end view of the nut.

The nut may be divided into three or four sections. I prefer and use three. Each section $a$ is made as a segment of a cylinder, having a screw-thread, 3, upon its narrow inner surface, and the back end 2 of the section is the thickest, so that when the sections are placed together the central hole will taper, and be the smallest at the inner end, and hence as the screw $b$ is screwed into the nut the inner end of the nut will be spread and bind firmly within the hole that receives it.

The screw $b$ is of the ordinary parallel form, known as machine-screws. This construction allows of the sections all being alike, and of cast metal; hence they will not require any labor in cutting or fitting, as the screw-thread corrugations will be cast.

In many instances it will be preferable to make use of a rib or ribs, $c$, upon the exterior of the nut-sections, and these ribs can be made to ream out their own recesses by applying a three-bladed wrench or screw-driver to revolve the nut-sections as they are expanded by the bolt inserted within them.

The ribs upon the nut sections may be peripheral, as seen in Figs. 1 and 2, or vertical or inclined, as in Fig. 4.

For attaching casters to furniture, and for connecting other articles, it is often preferable to provide flanges to the sections, as at $e$, to cause the nut to bear against the surface of the wood or other material.

I claim as my invention—

1. The expansion-nut made of separate sections of a cylinder, with the inner ends the thickest, and with screw-threaded corrugations, substantially as set forth.

2. The ribs $c$, in combination with the expansion-nut, made of separate sections of a cylinder, with the inner end the thickest, for the purposes and as set forth.

3. The combination, with the cylindrical expansion-nut sections, of the flanges $e$, substantially as set forth.

Signed by me this 22d day of March, A. D. 1876.

WILLIAM TUNSTILL.

Witnesses:
GEO. D. WALKER,
GEO. T. PINCKNEY.